United States Patent
Ono et al.

(10) Patent No.: US 9,870,197 B2
(45) Date of Patent: Jan. 16, 2018

(54) INPUT INFORMATION SUPPORT APPARATUS, METHOD FOR SUPPORTING INPUT INFORMATION, AND COMPUTER-READABLE RECORDING MEDIUM

(71) Applicant: FUJITSU LIMITED, Kawasaki-shi, Kanagawa (JP)

(72) Inventors: Shinichi Ono, Yokohama (JP); Yoshiki Matsuda, Kawasaki (JP); Yasuaki Takamoto, Kawasaki (JP); Natsue Nakamura, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/878,260

(22) Filed: Oct. 8, 2015

(65) Prior Publication Data

US 2016/0110159 A1 Apr. 21, 2016

(30) Foreign Application Priority Data

Oct. 15, 2014 (JP) .................. 2014-211025

(51) Int. Cl.
*G06F 17/21* (2006.01)
*G06F 17/27* (2006.01)
(Continued)

(52) U.S. Cl.
CPC .............. *G06F 3/167* (2013.01); *G10L 15/22* (2013.01); *G10L 15/26* (2013.01); *G10L 2015/223* (2013.01)

(58) Field of Classification Search
CPC ... G10L 15/22; G10L 2015/223; G10L 15/26; G10L 17/22; G10L 15/02; G10L 15/32;
(Continued)

(56) References Cited

U.S. PATENT DOCUMENTS 5,855,000 A * 12/1998 Waibel ..................... G06K 9/03
382/186
6,459,892 B2 * 10/2002 Burgan ............... H04L 12/1827
455/412.1
(Continued)

FOREIGN PATENT DOCUMENTS

JP  09-114824 A   5/1997
JP  2002163217 A  6/2002
(Continued)

OTHER PUBLICATIONS

Lucente et al., "Visualization Space: A Testbed for Deviceless MultimodalU ser Interface," Proceedings of the AAAI 1998 Spring Symposium on Intelligent Environments.*
(Continued)

*Primary Examiner* — Edgar Guerra-Erazo
(74) *Attorney, Agent, or Firm* — Westrerman, Hattori, Daniels & Adrian, LLP

(57) ABSTRACT

A buffer receives input from a plurality of objects. A display controller performs control to cause a display unit to display received pieces of input content of the objects in divided frames in time-series order of reception and display received input content additionally in a frame that displays past input content when a specific condition is satisfied.

6 Claims, 12 Drawing Sheets

(51) Int. Cl.
  *G10L 15/00* (2013.01)
  *G10L 21/00* (2013.01)
  *G10L 25/00* (2013.01)
  *G06F 3/16* (2006.01)
  *G10L 15/26* (2006.01)
  *G10L 15/22* (2006.01)

(58) Field of Classification Search
  CPC ... G10L 17/2765; G10L 17/21; G10L 17/241; G10L 17/274; G10L 17/30976; G06F 17/2765; G06F 17/21; G06F 17/241; G06F 17/274; G06F 17/30976; G06F 3/017; G06F 3/04842; G06F 17/211; G06F 17/212; G06F 17/30693; G06F 17/30755; G06F 17/30914; G06F 17/40; G06K 2209/01; H04M 2201/40
  See application file for complete search history.

(56) References Cited

U.S. PATENT DOCUMENTS

| | | | | |
|---|---|---|---|---|
| 6,898,612 | B1* | 5/2005 | Parra | G06K 9/6243 |
| | | | | 704/E21.012 |
| 7,584,099 | B2* | 9/2009 | Ma | G06F 3/038 |
| | | | | 704/239 |
| 7,801,728 | B2* | 9/2010 | Ben-David | G10L 15/26 |
| | | | | 704/270 |
| 7,958,244 | B2* | 6/2011 | Harpur | H04L 12/1822 |
| | | | | 709/204 |
| 8,311,838 | B2* | 11/2012 | Lindahl | G06F 3/167 |
| | | | | 704/231 |
| 8,457,959 | B2* | 6/2013 | Kaiser | G10L 15/24 |
| | | | | 704/231 |
| 8,886,222 | B1* | 11/2014 | Rodriguez | G01C 21/20 |
| | | | | 455/456.1 |
| 9,116,989 | B1* | 8/2015 | Ehlen | G06F 17/30554 |
| 9,230,549 | B1* | 1/2016 | Popik | H04L 51/36 |
| 2002/0135618 | A1* | 9/2002 | Maes | G06F 3/0481 |
| | | | | 715/767 |
| 2003/0126330 | A1* | 7/2003 | Balasuriya | G06F 3/038 |
| | | | | 710/107 |
| 2007/0133437 | A1* | 6/2007 | Wengrovitz | H04M 3/56 |
| | | | | 370/260 |
| 2008/0059177 | A1* | 3/2008 | Poirier | G06Q 50/06 |
| | | | | 704/251 |
| 2008/0167868 | A1* | 7/2008 | Kanevsky | G10L 15/20 |
| | | | | 704/233 |
| 2008/0201138 | A1* | 8/2008 | Visser | G10L 21/0208 |
| | | | | 704/227 |
| 2011/0301952 | A1 | 12/2011 | Koshinaka et al. | |
| 2013/0108994 | A1* | 5/2013 | Srinivasa | G09B 21/009 |
| | | | | 434/156 |
| 2013/0238312 | A1* | 9/2013 | Waibel | G10L 15/00 |
| | | | | 704/8 |
| 2013/0262096 | A1* | 10/2013 | Wilhelms-Tricarico | G10L 25/90 |
| | | | | 704/202 |
| 2013/0275875 | A1* | 10/2013 | Gruber | G10L 15/22 |
| | | | | 715/728 |
| 2013/0275899 | A1* | 10/2013 | Schubert | G06F 3/0481 |
| | | | | 715/765 |
| 2013/0304457 | A1* | 11/2013 | Kang | G10L 13/00 |
| | | | | 704/201 |
| 2014/0047358 | A1 | 2/2014 | Park et al. | |
| 2014/0059448 | A1 | 2/2014 | Lee | |
| 2014/0120987 | A1* | 5/2014 | Kim | G06F 17/21 |
| | | | | 455/563 |
| 2014/0222430 | A1* | 8/2014 | Rao | G10L 15/04 |
| | | | | 704/254 |
| 2015/0302865 | A1* | 10/2015 | Pilli | H04L 65/604 |
| | | | | 704/205 |
| 2016/0127287 | A1 | 5/2016 | Oh et al. | |

FOREIGN PATENT DOCUMENTS

| | | |
|---|---|---|
| JP | 2003-015686 A | 1/2003 |
| JP | 2005-514837 A | 5/2005 |
| JP | 2006-50500 A | 2/2006 |
| JP | 2006-251898 A | 9/2006 |
| JP | 2006-301223 A | 11/2006 |
| JP | 2007-058767 A | 3/2007 |
| JP | 2008-201066 A | 9/2008 |
| JP | 2009-053342 A | 3/2009 |
| JP | 2014-035770 A | 2/2014 |
| JP | 2014-044723 A | 3/2014 |
| WO | 03/058466 A1 | 7/2003 |
| WO | 2014/123270 A1 | 8/2014 |

OTHER PUBLICATIONS

Borkowski, S., Crowley, J. L., Letessier, J., & Berard, F. (Jan. 2006). User-centric design of a vision system for interactive applications. In Computer Vision Systems, 2006 ICVS'06. IEEE International Conference on (pp. 9-9). IEEE.*

Office Action dated Nov. 17, 2015, issued in counterpart Japanese Patent Application No. 2014-211025, with English translation (5 pages).

Extended Extended European Search Report dated Mar. 11, 2016, issued in counterpart European Patent Application No. 15188925.0. (8 pages).

Office Action dated Nov. 22, 2016, issued in corresponding Japanese Patent Application No. 2016-007486, with Partial English translation. (4 pages).

Office Action dated Nov. 22, 2016, issued in corresponding Japanese Patent Application No. 2016-007487, with Partial English translation. (3 pages).

Office Action dated Feb. 7, 2017, issued in counterpart Japanese Patent Application No. 2016-007486, with English translation. (4 pages).

Office Action dated Feb. 28, 2017, issued in counterpart European Patent Application No. 15188925.0. (7 pages).

Office Action dated Aug. 23, 2017, issued in counterpart European patent application No. 15188925.0 [5 pages].

* cited by examiner

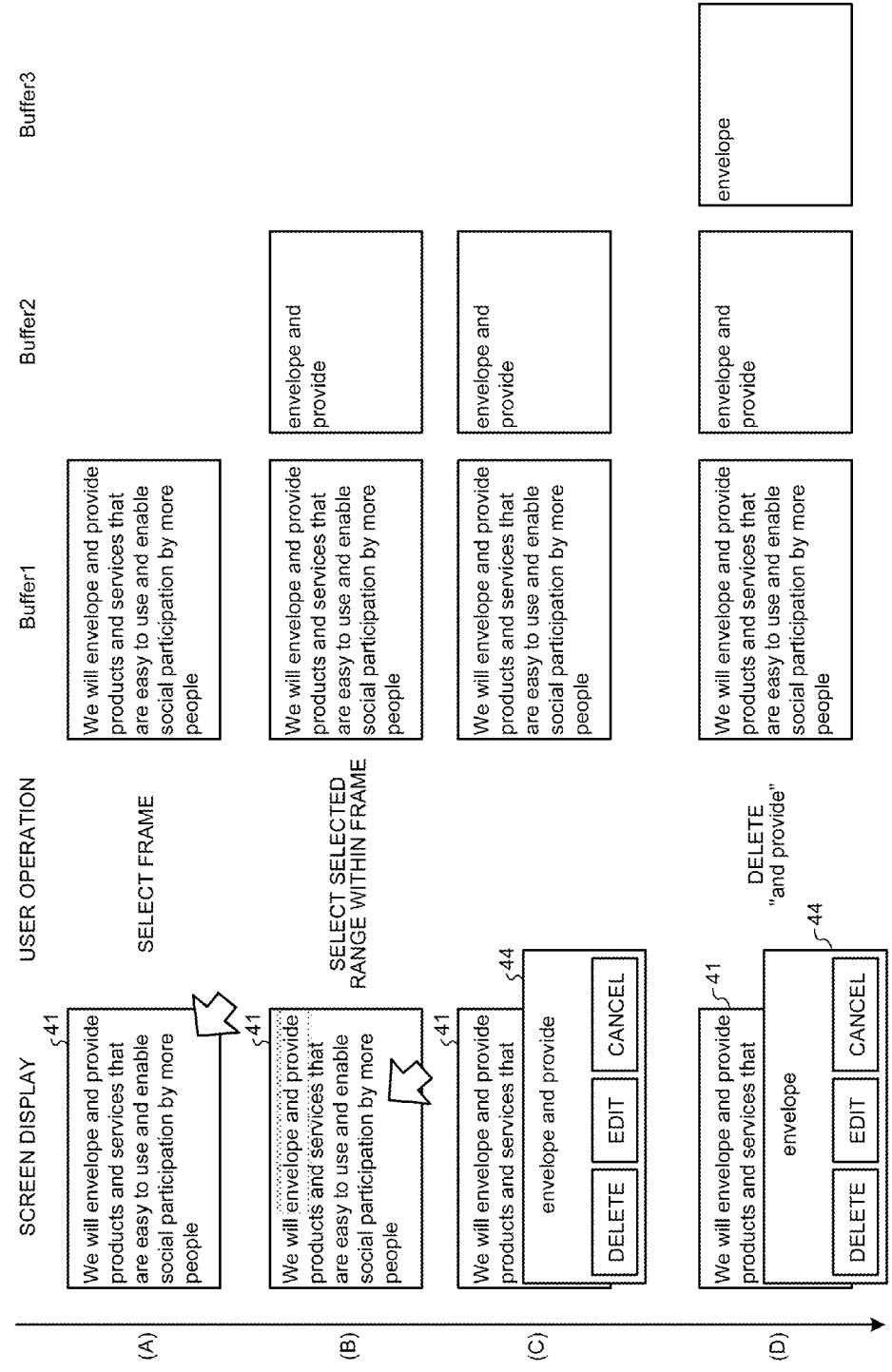

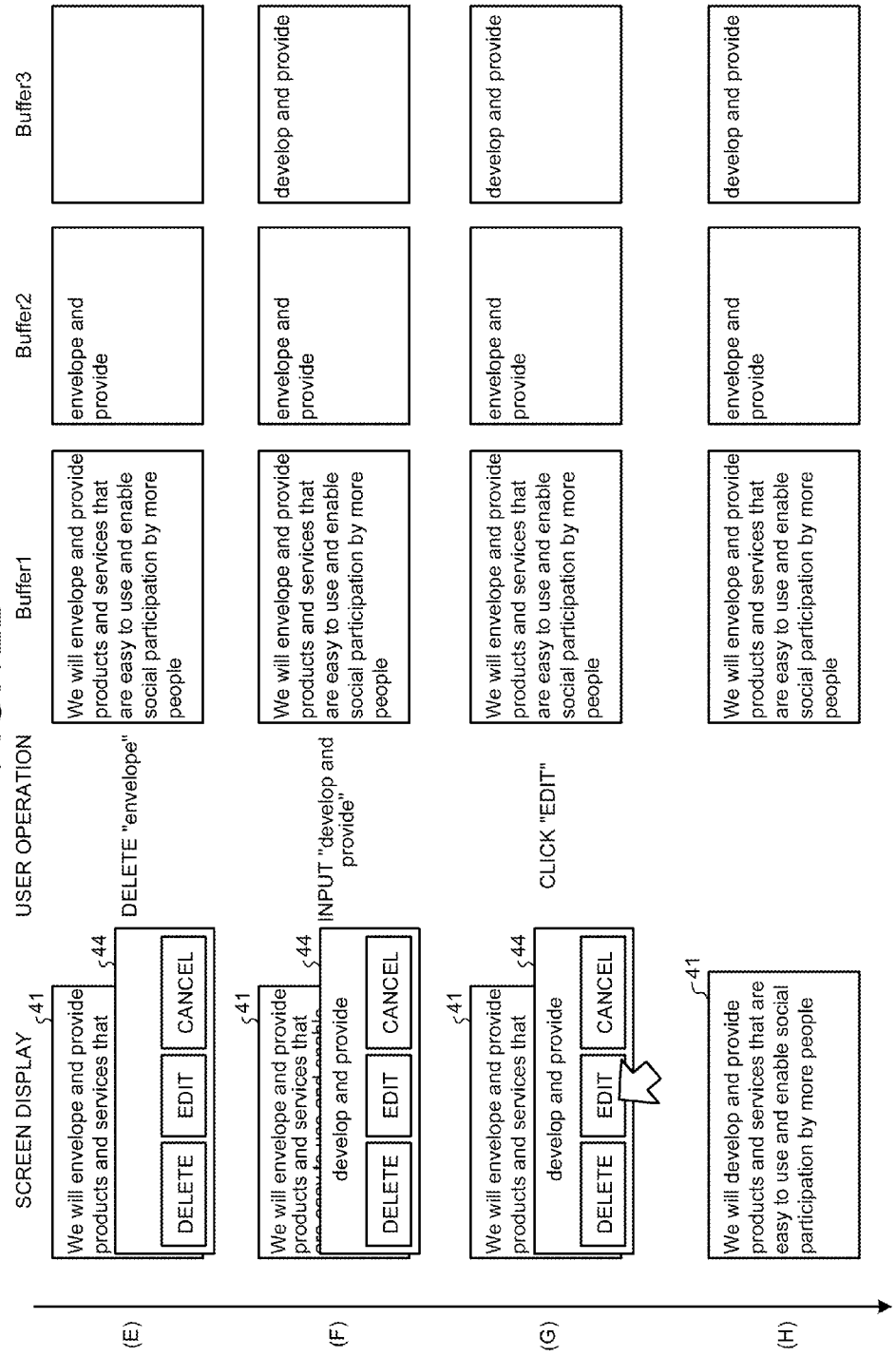

INPUT INFORMATION SUPPORT APPARATUS, METHOD FOR SUPPORTING INPUT INFORMATION, AND COMPUTER-READABLE RECORDING MEDIUM

CROSS-REFERENCE TO RELATED APPLICATIONS

This application is based upon and claims the benefit of priority of the prior Japanese Patent Application No. 2014-211025, filed on Oct. 15, 2014, the entire contents of which are incorporated herein by reference.

FIELD

The embodiments discussed herein are related to an input information support apparatus, a method for supporting input information, and a computer-readable recording medium.

BACKGROUND

Systems that voice recognize input through voices of speakers, convert the input into text, and display the input content converted into text in meetings or the like have been developed. In such a system, pieces of input content of a speaker are displayed in time-series order, for example. Conventional technologies are described in Japanese Laid-open Patent Publication No. 2006-50500, for example.

However, the conventional system may provide poor usability. When the pieces of input content of a speaker are displayed in time-series order, for example, when a plurality of speakers speak, the pieces of input content of each of the speakers are disconnectedly displayed, which may make the pieces of input content difficult to understand and may make usability poor. When a speaker B speaks midway during the speech of a speaker A, for example, the input content of the speaker B is displayed midway during the input content of the speech of the speaker A, which makes the input content spoken by the speaker A difficult to understand.

SUMMARY

According to an aspect of an embodiment, an input information support apparatus includes a receiving unit that receives input from a plurality of objects; and a display controller that performs control to cause a display unit to display pieces of input content of the objects received by the receiving unit in divided frames in time-series order of reception and display received input content additionally in a frame that displays past input content when a specific condition is satisfied.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12A is a diagram illustrating an example of the editing of input content;

FIG. 12B is a diagram illustrating another example of the editing of input content;

DESCRIPTION OF EMBODIMENTS

Preferred embodiments of the present invention will be explained with reference to accompanying drawings. The embodiments do not limit this invention. The embodiments can be combined appropriately to the extent that the processing details are not contradictory.

[a] First Embodiment

System Configuration

Figure 1:
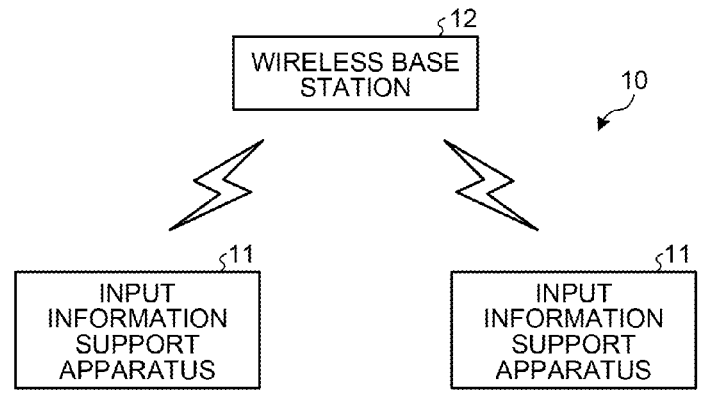
FIG. 1 is a diagram illustrating an example of a configuration of a meeting support system.

First, an example of a system that supports input of information using an input information support apparatus according to a first embodiment will be explained. The present embodiment explains a case in which the input information support apparatus is used for a meeting support system that supports meetings. FIG. 1 is a diagram illustrating an example of a configuration of the meeting support system. As illustrated in FIG. 1, this meeting support system 10 includes a plurality of input information support apparatuses 11. Although the example in FIG. 1 exemplifies a case of two input information support apparatuses 11, that is not limiting, and any two or more number of input information support apparatuses 11 can be included. The input information support apparatuses 11 are communicably connected via a network and can exchange various kinds of information. In the example in FIG. 1, the input information support apparatuses 11 are communicably connected through a network of a wireless local area network (LAN) with a wireless base station 12 as an access point. The network is not limited to the wireless LAN and may use any kind of communication network including mobile communication such as a wired LAN and a cellular phone, short-range wireless communication such as Bluetooth (registered trademark), and the Internet.

The input information support apparatus 11 is an apparatus used by a user who participates in a meeting. The input information support apparatus 11 is, for example, an information processing apparatus such as a personal computer, a tablet terminal, and a smartphone. Each input information support apparatus 11 operates a computer program that displays pieces of input content input to each apparatus in time-series order to support the meeting. The user who participates in the meeting inputs various kinds of information using the input information support apparatus 11. The input information support apparatus 11 displays the input content and transmits the input content to another input information support apparatus 11. The input information support apparatus 11 displays input content received from the other input information support apparatus 11. With this operation, the meeting support system 10 can refer to the input content input by each user by each input information support apparatus 11. The meeting support system 10 is used when a meeting is held including a hearing-impaired user or when a meeting is held between remote users, for example.

Hardware Configuration of Input Information Support Apparatus 11

Figure 2:
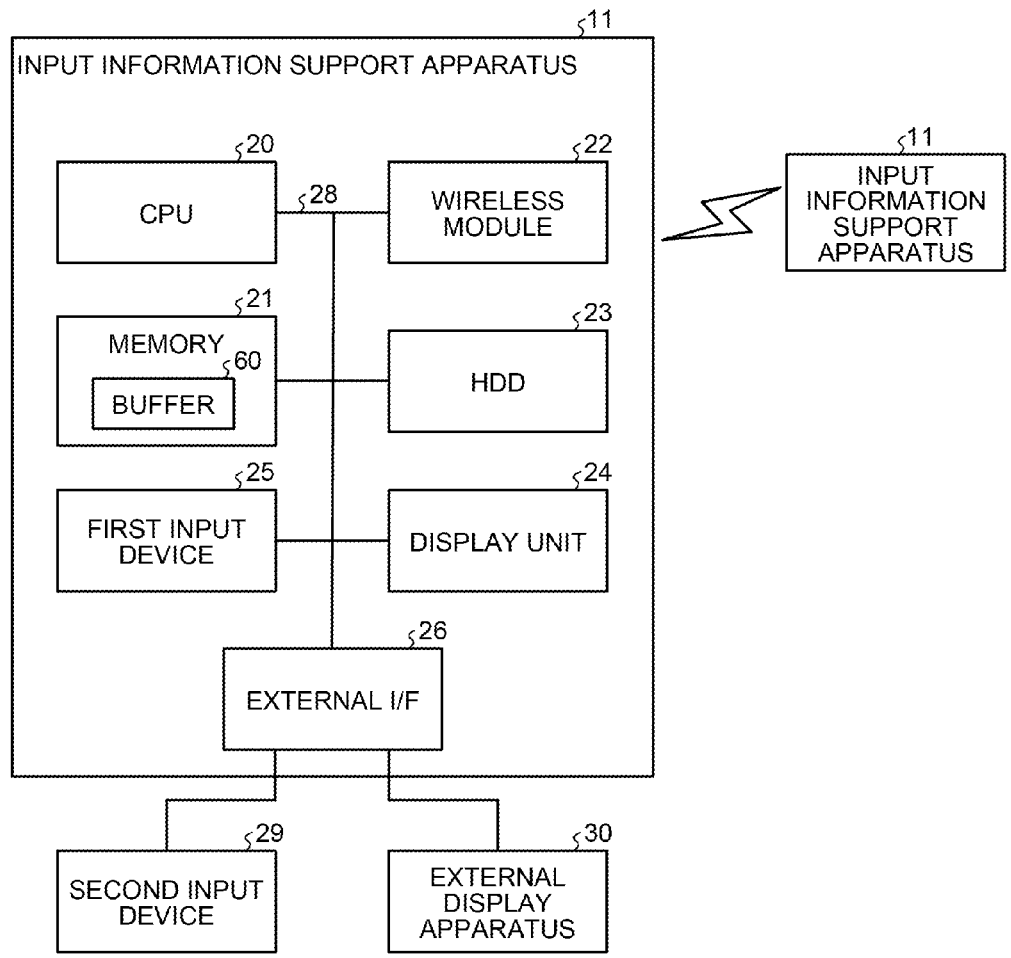
FIG. 2 is a diagram illustrating an example of a hardware configuration of an input information support apparatus.

Next, a hardware configuration of the input information support apparatus 11 according to the first embodiment will be explained. FIG. 2 is a diagram illustrating an example of the hardware configuration of the input information support apparatus. FIG. 2 is a diagram illustrating an example in which a personal computer constitutes the input information support apparatus 11. As illustrated in FIG. 2, the input information support apparatus 11 includes a central processing unit (CPU) 20, a memory 21, a wireless module 22, a hard disk drive (HDD) 23, a display unit 24, a first input device 25, and an external interface (I/F) 26. The CPU 20, the memory 21, the wireless module 22, the HDD 23, the display unit 24, the first input device 25, and the external I/F 26 are connected via a bus 28. The input information support apparatus 11 may include, in addition to the hardware illustrated in FIG. 2, various kinds of hardware included in known computers.

The CPU 20 is a device that controls the input information support apparatus 11. The CPU 20 executes various kinds of computer programs related to input information support, thereby functioning as various kinds of processing units and causing the personal computer to function as the input information support apparatus 11. Details of the functions implemented by the CPU 20 will be explained below.

The memory 21 is a device that temporarily stores therein the computer programs executed by the CPU 20 and various kinds of data used by the computer programs. In the input information support apparatus 11 according to the present embodiment, the memory 21 includes a storage area of a buffer 60 that store therein input content input user.

The wireless module 22 is a communication device that performs communication with another input information support apparatus 11. The wireless module 22 exchanges various kinds of information with the other input information support apparatus 11 through wireless LAN communication under the control of the CPU 20. The wireless module 22 transmits the input content input by the user to the other input information support apparatus 11, for example. The wireless module 22 receives input content input to the other input information support apparatus 11 from the other input information support apparatus 11.

The HDD 23 is a device that stores therein the various kinds of computer programs executed by the CPU 20 and various kinds of data. In the input information support apparatus 11 according to the present embodiment, the HDD 23 stores therein a computer program that displays pieces of input content in time-series order to support the meeting.

The display unit 24 is a device that displays various kinds of information. Examples of the display unit 24 include display devices such as a liquid crystal display (LCD). The display unit 24 displays various kinds of information. The display unit 24 displays a conversation screen explained below, for example.

The first input device 25 is a device by which the user operates to input various kinds of information. Examples of the first input device 25 include input devices such as a keyboard, a mouse, various kinds of buttons provided in the input information support apparatus 11, and a transmission type touch sensor provided on the display unit 24. Although the example in FIG. 2 illustrates the functional configuration and separates the display unit 24 and the first input device 25 from each other, the example in FIG. 2 may be configured by a device that integrally includes the display unit 24 and the first input device 25 such as a touch panel.

The external I/F 26 is an interface that performs input and output of data with external devices. Examples of the external I/F 26 include input and output ports such as Universal Serial Bus (USB) and video input and output ports such as a display port and High-Definition Multimedia Interface (HDMI) (registered trademark). The external devices are connected to the external I/F 26. In the example in FIG. 2, a second input device 29 and an external display apparatus 30 are connected to the external I/F 26.

The second input device 29 is a device by which the user inputs various kinds of information through voices. Examples of the second input device 29 include a microphone that collects voices of the user and outputs voice data.

The external display apparatus 30 is a device that displays various kinds of information. Examples of the external display apparatus 30 include display devices that can be attached and detached to and from the input information support apparatus 11 such as a projector that projects images and an external display.

The input information support apparatus 11 according to the present embodiment operates the computer program that supports the meeting and displays a conversation screen that displays pieces of input content input from the first input device 25 or the second input device 29 of the apparatus itself or the other input information support apparatus 11 in time-series order.

Conversation Screen

Figure 3:
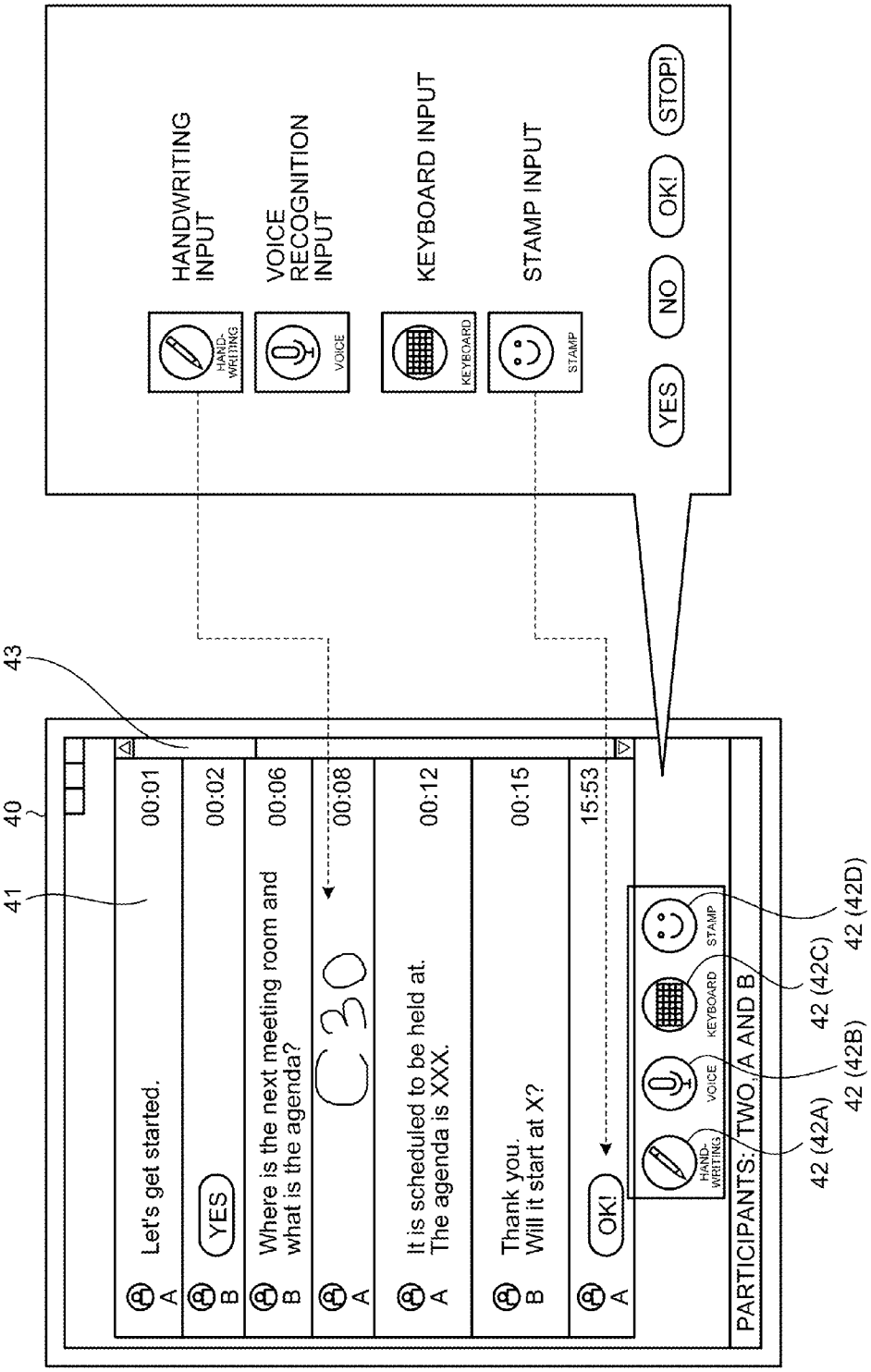
FIG. 3 is a diagram illustrating an example of a conversation screen.

FIG. 3 is a diagram illustrating an example of the conversation screen. This conversation screen 40 displays pieces of input content received from respective users in time-series order of reception in divided frames 41. The conversation screen 40 includes a plurality of input icons 42 for the user to perform input. Provided in the example in FIG. 3 as the input icons 42 are a handwriting input icon 42A, a voice recognition input icon 42B, a keyboard input icon 42C, and a stamp input icon 42D. The example in FIG. 3 displays seven frames 41 input by users A and B. Each frame 41 displays input content input and an input time.

The handwriting input icon 42A is an icon that designates that input content is input by handwriting. When the handwriting input icon 42A is selected, handwriting input is made available by a mouse operation or touch operation, and an image input by handwriting is determined to be the input content. The fourth line frame 41 in the example in FIG. 3 illustrates a case in which an image handwritten as "C30" is input.

The voice recognition input icon 42B is an icon that designates that input content is input by voice. When the voice recognition input icon 42B is selected, characters obtained by voice recognizing voice data input from the microphone is determined to be the input content.

The keyboard input icon 42C is an icon that designates that input content is input with a keyboard. When the keyboard input icon 42C is selected, characters input from the keyboard are determined to be the input content.

The stamp input icon 42D is an icon that designates that input content is input with illustrations. When the stamp input icon 42D is selected, stamps that illustrate various kinds of pieces of input content are displayed, and a selected illustration is determined to be the input content. In the example in FIG. 3, when the stamp input icon 42D is selected, stamps with "YES," "NO," "OK!," and "STOP!" attached thereon are displayed, and the image of a selected stamp is determined to be the input content. The seventh line frame 41 in the example in FIG. 3 illustrates a case in which the stamp of "OK!" is input.

Although the input information support apparatus 11 according to the present embodiment can switch the type of input by the input icon 42 on the conversation screen 40, the type of input may be switched in accordance with the input content. The input information support apparatus 11, when receiving a voice of a threshold or more from the microphone, may perform voice recognition on the input voice and determine voice-recognized characters to be the input content, for example. When key input is performed from the keyboard, the input information support apparatus 11 may determine input characters to be the input content. When a plurality of stamps are displayed on part of the screen and a stamp is selected by a touch operation or mouse operation, the input information support apparatus 11 may determine the selected stamp to be the input content. When a handwriting input area is displayed on part of the screen and handwriting input is performed in the input area by a touch operation or mouse operation, the input information support apparatus 11 may determine the image handwritten in the input area to be the input content.

In the conversation screen 40, the pieces of input content received from the respective users are displayed in the vertical direction in the divided frames 41 in time-series order. When a display area overflows, the frames 41 collectively move in the vertical direction so that old displayed content is out of the display area. The conversation screen 40 includes a scroll bar 43 that moves the display area, and by moving the display area with the scroll bar 43, the old display content being once out of the display area can be displayed.

When the pieces of input content of a user are displayed in the frames 41 in time-series order, when a plurality of users perform input, the pieces of input content of each of the users are disconnectedly displayed, which may make the input content difficult to understand and may make usability poor. Given these circumstances, the input information support apparatus 11 according to the present embodiment performs control to display received input content additionally in the frame 41 that displays past input content when a specific condition is satisfied.

Functional Configuration of Input Control

Figure 4:
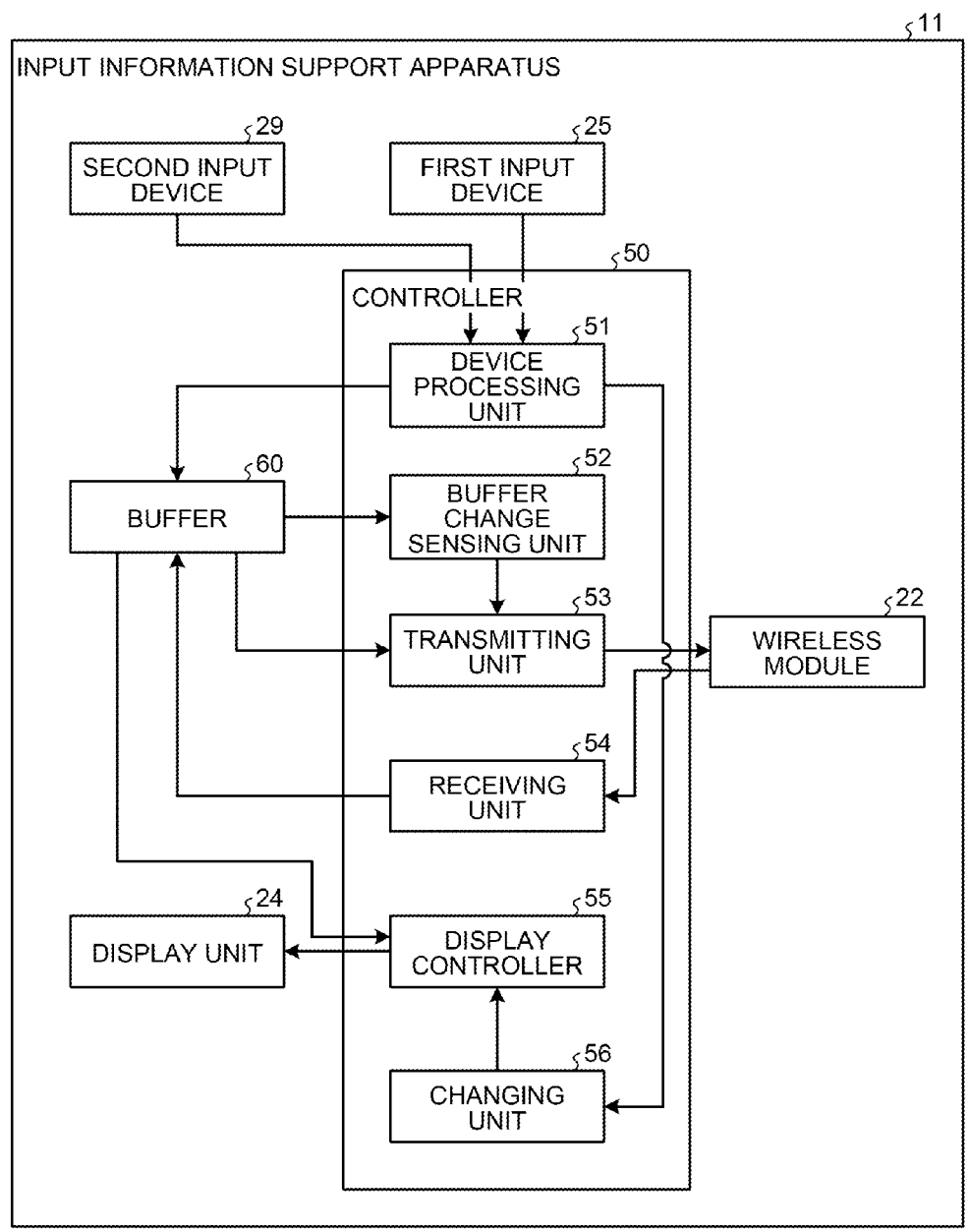
FIG. 4 is a diagram illustrating an example of a functional configuration by which the input information support apparatus performs input control.

A functional configuration will be explained by which the input information support apparatus 11 performs input control to display the received input content additionally in the frame that displays the past input content when the specific condition is satisfied. FIG. 4 is a diagram illustrating an example of the functional configuration by which the input information support apparatus performs input control.

A controller 50 is a device that controls the input information support apparatus 11 and is the CPU 20, for example.

Examples of the controller 50 include, apart from the CPU, electronic circuits such as a micro processing unit (MPU) and integrated circuits such as an application specific integrated circuit (ASIC) and a field programmable gate array (FPGA). The controller 50 includes an internal memory for storing therein computer programs that define various kinds of processing procedures and control data and thereby executes various kinds of processing. The controller 50 operates various kinds of computer programs and functions as various kinds of processing units. The controller 50 functions as a device processing unit 51, a buffer change sensing unit 52, a transmitting unit 53, a receiving unit 54, a display controller 55, and a changing unit 56 through the operation of the computer programs stored in the HDD 23, for example.

The device processing unit 51 performs certain preprocessing for recognizing input content on information input from the first input device 25 and the second input device 29 and recognizes input content of a user. The device processing unit 51 performs character conversion in accordance with keys input from the keyboard as the first input device 25, for example. When handwriting input is performed by the mouse or touch sensor as the first input device 25, the device processing unit 51 generates an image input by handwriting. When a stamp is selected by the mouse or touch sensor as the first input device 25, the device processing unit 51 extracts the image of the selected stamp. When voice data is input from the microphone as the second input device 29, the device processing unit 51 performs voice recognition on the input voice data and performs character conversion. Although the example in FIG. 4 illustrates the device processing unit 51 as one processing unit, it may be illustrated as separate processing units for each type of input. The device processing unit 51 adds identification information of the user who has performed input and input time information to the recognized input content of the user and stores the recognized input content of the user in the buffer 60. The identification information of the user may be, for example, a user ID that has logged on to the system, or identification information of the input information support apparatus 11 such as a machine name of the input information support apparatus 11 may be used as a substitute.

The buffer 60 receives input content from users and manages and stores therein the received input content. The buffer 60 manages and stores therein the input content from users separately for each user and input content, for example. In the present embodiment, the buffer 60 is an example of a receiving unit.

The buffer change sensing unit 52 senses a change in the input content stored in the buffer 60. The buffer change sensing unit 52 monitors whether input content data has been stored in the buffer 60 from the device processing unit 51 and senses a change in data, for example. In other words, the buffer change sensing unit 52 senses a change in the data of the user of its own apparatus stored in the buffer 60, thereby sensing whether input has been performed by the user on its own apparatus.

When it is sensed by the buffer change sensing unit 52 that input has been performed by the user on its own apparatus, the transmitting unit 53 transmits the input content data from the sensed user to the other input information support apparatus 11. With this operation, the input content input by the user on its own apparatus is displayed on the other input information support apparatus 11.

The receiving unit 54 receives input content data input on the other input information support apparatus 11 and transmitted from the other input information support apparatus 11. To this input content data, identification information of a user who has performed input on the other input information support apparatus 11 and input time information have been added. The receiving unit 54 stores the received input content data in the buffer 60.

The display controller 55 performs control to cause the display unit 24 to display the pieces of input content of a plurality of users stored in the buffer 60 in divided frames in time-series order of reception. The display controller 55 performs control to cause the display unit 24 to display the pieces of input content in divided frames in time-series order of reception based on the pieces of time information added to the respective pieces of input content stored in the buffer 60, for example. The display controller 55 performs control to display the received input content additionally in the frame that displays the past input content when a specific condition is satisfied. The specific condition is that, after the immediately preceding input content is received, the next input content of the same user is received before a predetermined first period of time, for example. When the specific condition is satisfied, the display controller 55 performs control to display the received input content additionally in a frame that displays the immediately preceding input content of the same user that satisfies the specific condition. The first period of time is set to 3 seconds, for example. When receiving the next input content before 3 seconds after receiving the immediately preceding input content of the same user, the display controller 55 performs control to display the received input content additionally in the frame that displays the immediately preceding input content of the same user.

Even when the display controller 55 displays the received input content additionally in the frame that displays the immediately preceding input content of the same user, the display form may be separated in accordance with a time at which the input content has been input. For example, when receiving the next input content before a second period of time that is shorter than the first period of time after receiving the immediately preceding input content of the same user, the display controller 55 performs control to display the received input content in the frame that displays the past input content following the past input content. When the received input content is displayed following the past input content, in order to indicate a pause between the pieces of input content, the display controller 55 may add a certain separator such as a blank and a comma to the frame that displays the past input content and then add the received input content. When receiving the next input content in a time range between the first period of time and the second period of time after receiving the immediately preceding input content of the same user, the display controller 55 performs control to display the received input content in the frame that displays the past input content with a line feed after the past input content. The first period of time is set to 3 seconds, whereas the second period of time is set to 2 second, for example. When receiving the next input content before 2 seconds after receiving the immediately preceding input content of the same user, the display controller 55 performs control to display the received input content in the frame that displays the past input content following the past input content. When receiving the next input content in a time range of 2 seconds or more and less than 3 seconds after receiving the immediately preceding input content of the same user, the display controller 55 performs control to display the received input content in the frame that displays the past input content with a line feed after the past input content.

The changing unit 56 makes a change to relax the specific condition when a certain change is made to input. The changing unit 56 performs a change to relax the specific condition when a method for inputting input content has been changed from the immediately preceding input of the same user, for example. For example, when the method of input has been changed, such as when the method of input has been changed from voice input through voice recognition to keyboard input, the changing unit 56 makes a change to extend the first period of time from 3 seconds to 5 seconds or the like. The changing unit 56 may also make a change to extend the second period of time.

Figure 5:
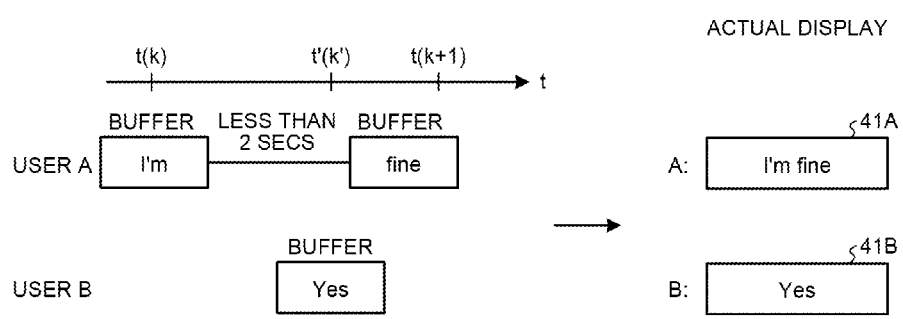
FIG. 5 is a diagram illustrating an example of input order-dependent display.

An explanation will be given with reference to specific examples. FIG. 5 is a diagram illustrating an example of input order-dependent display. FIG. 5 illustrates a case in which while the user A inputs "I'm" and "fine," the user B inputs "Yes." In the example in FIG. 5, it is assumed that the interval between "I'm" and "fine" is less than 2 seconds.

In this case, the display controller 55 displays the input content "I'm" of the user A in a frame 41A and then displays the input content "Yes" of the user B in a frame 41B. The input "fine" of the user A is made before 2 seconds after the input content "I'm" is received, and the display controller 55 displays "fine" additionally in the frame 41A following "I'm." With this operation, "I'm fine" is displayed in the frame 41A. Even when the input of the user B is thus performed midway during the input content of the user A, the pieces of input content of the user A can be displayed in succession in the same frame 41A, thereby making the pieces of input content of the user A easy to understand.

Figure 6:
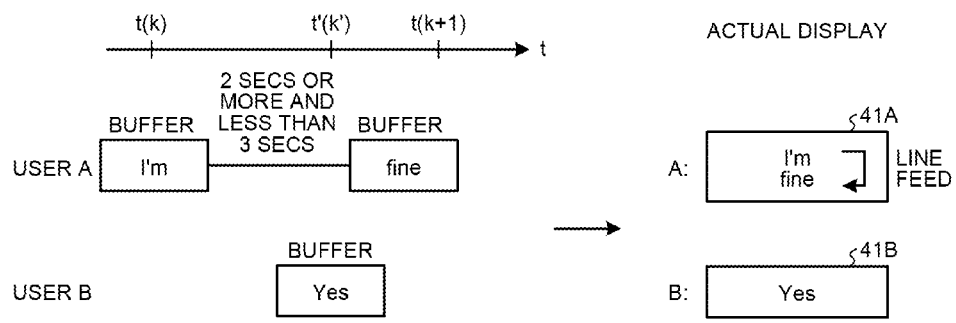
FIG. 6 is a diagram illustrating another example of the input order-dependent display.

FIG. 6 is a diagram illustrating another example of the input order-dependent display. FIG. 6 illustrates a case in which while the user A inputs "I'm" and "fine," the user B inputs "Yes." In the example in FIG. 6, it is assumed that the interval between "I'm" and "fine" is 2 seconds or more and less than 3 seconds.

In this case, the display controller 55 displays the input content "I'm" of the user A in the frame 41A and then displays the input content "Yes" of the user B in the frame 41B. The input "fine" of the user A is made 2 seconds or more and less than 3 seconds after the input content "I'm" is received, and the display controller 55 displays "fine" additionally in the frame 41A with a line feed after "I'm." With this operation, "I'm," the line feed, and "fine" are displayed in the frame 41A. Even when the input of the user B is thus performed midway during the input content of the user A, the pieces of input content of the user A are displayed in the same frame 41A, thereby making the pieces of input content of the user A easy to understand. In addition, the line feed is placed in the pieces of input content of the user A, thereby enabling the presence of an interval between "I'm" and "fine" input by the user A to be visually represented.

Figure 7:
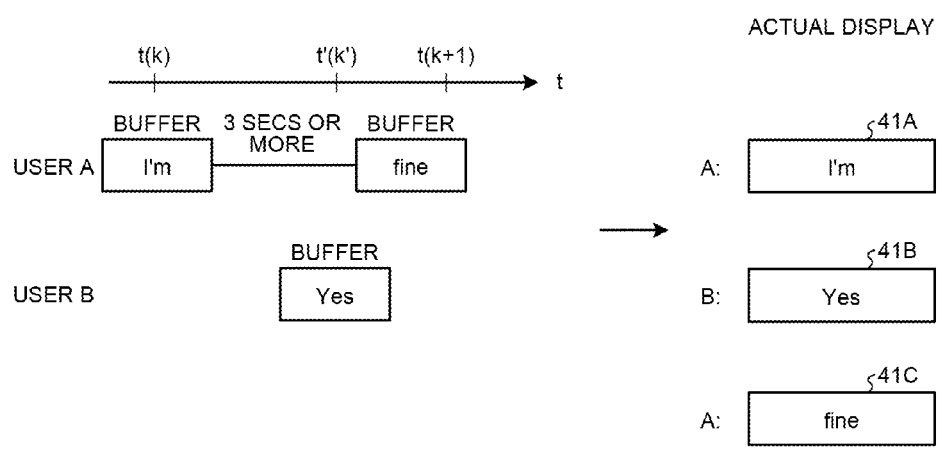
FIG. 7 is a diagram illustrating still another example of the input order-dependent display.

FIG. 7 is a diagram illustrating another example of the input order-dependent display. FIG. 7 illustrates a case in which while the user A inputs "I'm" and "fine," the user B inputs "Yes." In the example in FIG. 7, it is assumed that the interval between "I'm" and "fine" is 3 seconds or more.

In this case, the display controller 55 displays the input content "I'm" of the user A in the frame 41A and then displays the input content "Yes" of the user B in the frame 41B. The input "fine" of the user A is made 3 seconds or more after the input content "I'm" is received, and the display controller 55 displays "fine" in a new frame 41C. With this operation, "I'm," "Yes," and "fine" are displayed in the separate frames 41A through 41C. When an interval is thus placed in between the pieces of input content of the user A, they are separately displayed, thereby enabling the presence of an interval between the pieces of input content of the user A to be visually represented.

Figure 8:
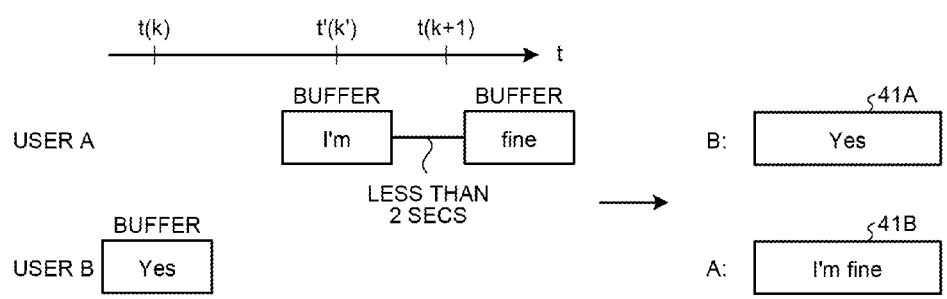
FIG. 8 is a diagram illustrating still another example of the input order-dependent display.

FIG. 8 is a diagram illustrating another example of the input order-dependent display. FIG. 8 illustrates a case in which the user B inputs "Yes," and then the user A inputs "I'm" and "fine." In the example in FIG. 8, it is assumed that the interval between "I'm" and "fine" is less than 2 seconds.

In this case, the display controller 55 displays the input content "Yes" of the user B in the frame 41A and displays the input content "I'm" of the user A in the frame 41B. The input "fine" of the user A is made before 2 seconds after the input content "I'm" is received, and the display controller 55 displays "fine" additionally in the frame 41B following "I'm." With this operation, "I'm fine" is displayed in the frame 41B.

Procedure of Processing of Input Control

Figure 9:
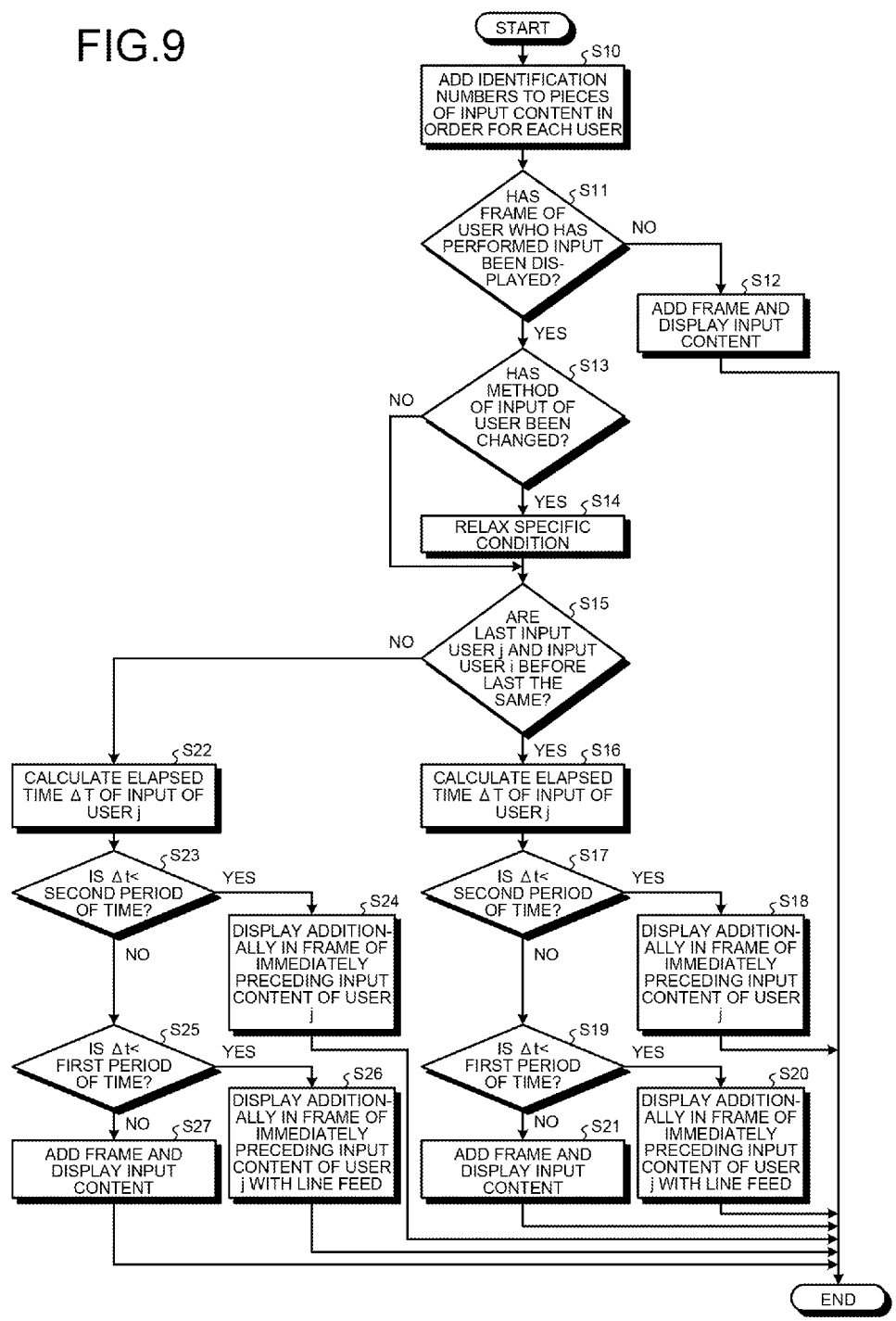
FIG. 9 is a flowchart illustrating an example of a procedure of input information support processing.

A procedure of input information support processing by which the input information support apparatus 11 according to the present embodiment supports display of input information will be explained. FIG. 9 is a flowchart illustrating an example of the procedure of the input information support processing. The input information support processing is executed at certain timing such as at timing when input content data is stored in the buffer 60 from the device processing unit 51 or the receiving unit 54.

As illustrated in FIG. 9, the display controller 55 adds identification numbers to pieces of input content data in order of being stored in the buffer 60 for each user (S10). When two persons, or the users A and B, perform input, for example, the display controller 55 reserves variables P and Q the respective initial values of which are set to zero. The display controller 55 then, each time the input content data of the user A is stored in the buffer 60, adds a value of the variable P with incremented to the input content data. The display controller 55, each time the input content data of the user B is stored in the buffer 60, adds a value of the variable Q with incremented to the input content data.

The display controller 55 determines whether the frame 41 of a user j who has input input content last stored in the buffer 60 has been displayed (S11). If the frame 41 of the user j has not been displayed (No at S11), the display controller 55 adds the frame 41 of the user j and displays the input content last stored in the buffer 60 (S12) and ends the processing. With this operation, for a user the input content of which has never been displayed, the frame 41 is displayed by this processing.

In contrast, if the frame 41 of the user j has been displayed (Yes at S11), the changing unit 56 determines whether the method for inputting input content has been changed from the immediately preceding input of the same user (S13). If the method of input has not been changed (No at S13), the processing shifts to S15 explained below.

If the method of input has been changed (Yes at S13), the changing unit 56 makes a change to relax the specific condition (S14). The changing unit 56 makes a change to extend the first period of time from 3 seconds to 5 seconds or the like, for example. The display controller 55 determines whether the user j who has input the input content last stored in the buffer 60 is the same as a user i who has input the input content before last (S15). If the user j and the user i are the same (Yes at S15), the display controller 55 determines an elapsed time Δt from the immediately preceding input with the identification number of the user j (S16). When the input content before last is input by the user A, for example, the display controller 55 determines a difference between times when pieces of input content the identification numbers of which are added with the variables P and P−1 are input. In this case, the last input content and the input content before last are ones by the same user, and the display controller 55 determines the elapsed time Δt between the last input content and the input content before last.

The display controller 55 determines whether the elapsed time Δt is less than the second period of time (S17). If the elapsed time Δt is less than the second period of time (Yes at S17), the display controller 55 displays the input content last stored in the buffer 60 additionally in the frame that displays the immediately preceding input content of the user j (S18) and ends the processing.

In contrast, if the elapsed time Δt is not less than the second period of time (No at S17), the display controller 55 determines whether the elapsed time Δt is less than the first period of time (S19). If the elapsed time Δt is less than the first period of time (Yes at S19), the display controller 55 displays the input content last stored in the buffer 60 additionally in the frame that displays the immediately preceding input content of the user j with a line feed (S20) and ends the processing.

In contrast, if the elapsed time Δt is not less than the first period of time (No at S19), the display controller 55 adds the frame 41 and displays the input content last stored in the buffer 60 (S21) and ends the processing.

If the user j and the user i are not the same (No at S15), the display controller 55 determines the elapsed time Δt from the immediately preceding input with the identification number of the user j (S22). When the input content before last is one by the user A, for example, the display controller 55 determines a difference between times when pieces of input content the identification numbers of which are added with the variables P and P−1 are input.

The display controller 55 determines whether the elapsed time Δt is less than the second period of time (S23). If the elapsed time Δt is less than the second period of time (Yes at S23), the display controller 55 displays the input content last stored in the buffer 60 additionally in the frame that displays the immediately preceding input content of the user j (S24) and ends the processing.

In contrast, if the elapsed time Δt is not less than the second period of time (No at S23), the display controller 55 determines whether the elapsed time Δt is less than the first period of time (S25). If the elapsed time Δt is less than the first period of time (Yes at S25), the display controller 55 displays the input content last stored in the buffer 60 additionally in the frame that displays the immediately preceding input content of the user j with a line feed (S26) and ends the processing.

In contrast, if the elapsed time Δt is not less than the first period of time (No at S25), the display controller 55 adds the frame 41 and displays the input content last stored in the buffer 60 (S27) and ends the processing.

This input information support processing displays the received input content additionally in the frame that displays the immediately preceding input content of the same user when receiving the next input content before 3 seconds after receiving the immediately preceding input content of the same user, and the input content of the user A can be made easy to understand.

The input content displayed in the frame 41 may be erroneous caused by, for example, an input error from the keyboard, a conversion error, or an error in voice recognition. Given these circumstances, the input information support apparatus 11 according to the present embodiment can receive the editing of the input content displayed in the frame 41. The input information support apparatus 11 according to the present embodiment can select a range for the input content displayed in the frame 41 and receive partial editing, for example.

Procedure of Editing

Figure 10:
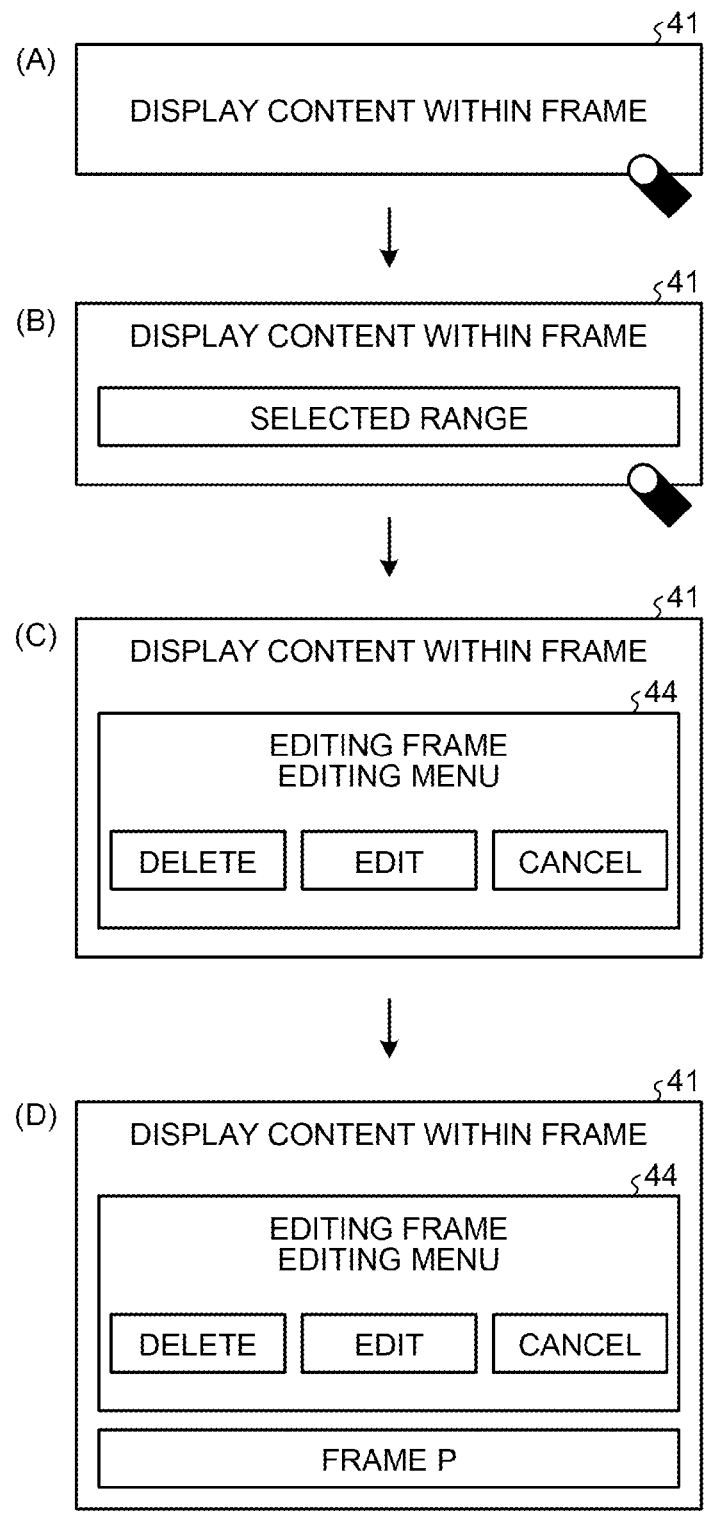
FIG. 10 is a diagram illustrating an example of a procedure of editing.

FIG. 10 is a diagram illustrating an example of a procedure of editing. When the user edits display content displayed in any frame 41, the user selects the frame 41 to be edited (FIG. 10 (A)). This editing can be selected in any frame 41. In other words, the user can also edit, in addition to the frame 41 input by the user itself, the frame 41 input by another user. The user performs range selection for a part with an error in the frame 41 to be edited (FIG. 10 (B)). In the frame 41 subjected to range selection, the selected input content is displayed in an editing frame 44 (FIG. 10 (C)). The editing frame 44 includes buttons of "delete," "edit," and "cancel". The button of "delete" is a button that designates deletion of the selected frame 41. The button of "edit" is a button that designates reflection of correction content on the selected input content. The button of "cancel" is a button that designates cancel of editing.

When the user performs editing such as correction, deletion, and addition with part displayed in the editing frame 44 as an object to be edited and reflects the editing, the user selects the button of editing. During the editing, when input by the user who has been performing input to the frame 41 is continued, input content continuously input is displayed in a frame P (FIG. 10 (D)). In other words, the input information support apparatus 11 enables the other user to perform editing on the input content of the frame 41 to which the user is performing input.

Functional Configuration of Editing

Figure 11:
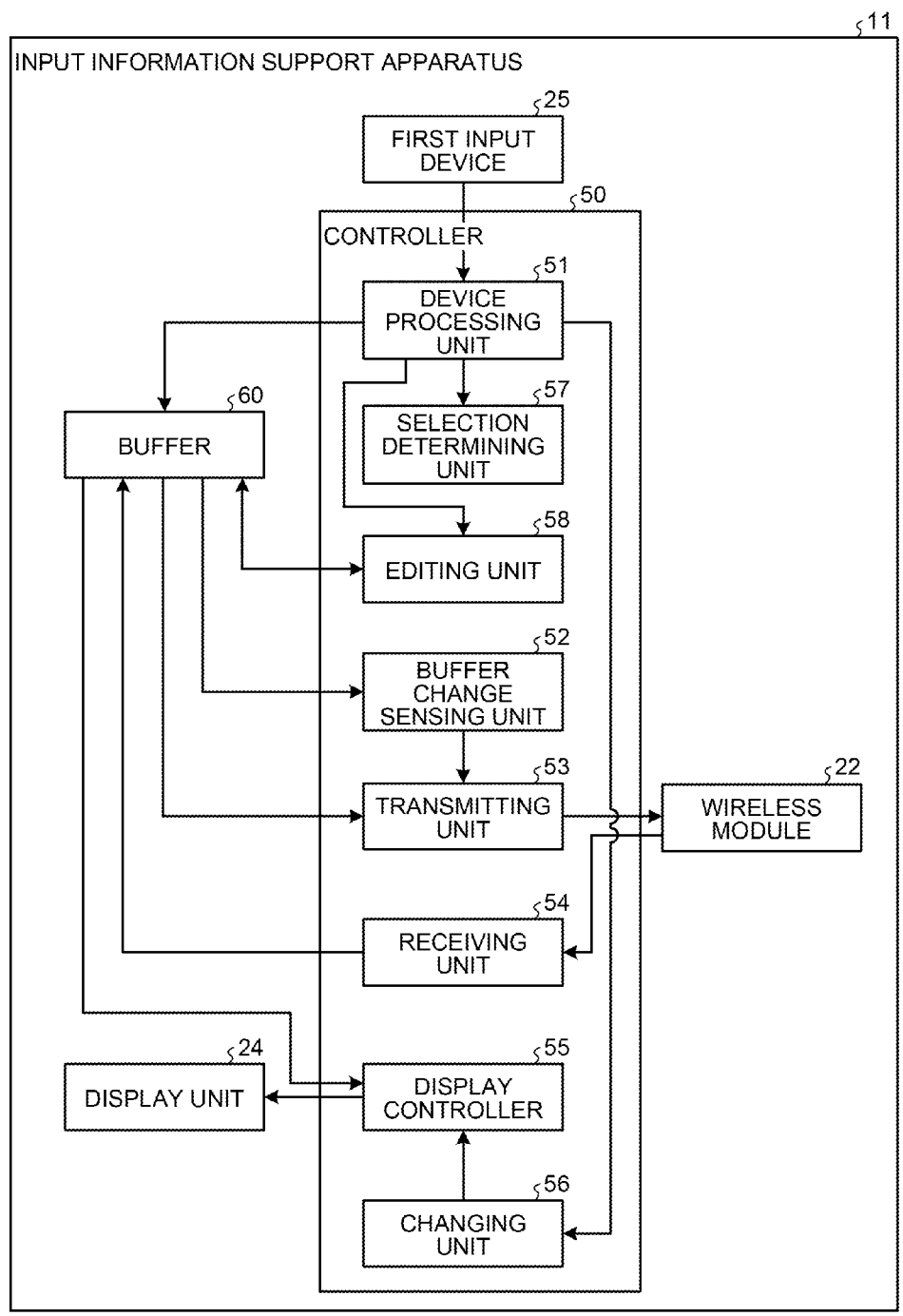
FIG. 11 is a diagram illustrating an example of a functional configuration that edits input content.

A functional configuration by which the input information support apparatus 11 edits the input content displayed in the frame 41 will be explained. FIG. 11 is a diagram illustrating an example of the functional configuration that edits the input content. The same parts as those in FIG. 4 will be attached with the same symbols, and the different parts will mainly be explained. The controller 50 further includes a selection determining unit 57 and an editing unit 58.

The selection determining unit 57 determines whether range selection has been performed on any frame 41. If range selection has been performed on any frame 41, the selection determining unit 57 determines the frame 41 subjected to range selection and a selected range selected in the input content.

If range selection has been performed on the frame 41, the display controller 55 displays the editing frame 44 for editing the selected range in the frame 41 subjected to range selection and receives the editing of the input content through the editing frame 44.

The editing unit 58 copies the input content displayed in the editing frame 44 in the input content data of the frame 41 subjected to range selection stored in the buffer 60 to another storage area within the buffer 60 as an object to be edited. The editing unit 58 receives correction on the object to be edited in accordance with operation on the editing frame 44.

The buffer change sensing unit 52 monitors a change in the input content data stored in the buffer 60 by the editing unit 58 and senses a change in the data by the editing unit 58.

The transmitting unit 53 transmits the data of the part edited by the editing unit 58 sensed by the buffer change sensing unit 52 to the other input information support apparatus 11. With this operation, the edited part is displayed also in the other input information support apparatus 11.

The receiving unit 54 receives data of edited part edited by the other input information support apparatus 11 and transmitted from the other input information support apparatus 11. The receiving unit 54 stores the data of the edited part in the buffer 60. With this operation, the part edited by the other input information support apparatus 11 is displayed also in the input information support apparatus 11.

The display controller 55, in accordance with the correction on the object to be edited received by the editing unit 58, displays the input content with the correction reflected in the frame 41 subjected to range selection.

An explanation will be given with reference to specific examples. FIG. 12A and FIG. 12B are diagrams illustrating an example of the editing of input content. FIG. 12A and FIG. 12B illustrate a procedure in which there is an error in the part "envelope and provide" in the frame 41 in which "We will envelope and provide products and services that are easy to use and enable social participation by more people" has been input and the user performs editing to correct the error. In the area of Buffer 1 within the buffer 60, the input content displayed in the frame 41 is stored (FIG. 12A (A)).

The user selects the frame 41 to be edited. The user then performs range selection for the part with the error of the frame 41. In the example in FIG. 12A, the Part "envelope and provide" is selected. When it is detected by the selection determining unit 57 that range selection has been performed on the frame 41, the editing unit 58 copies the selected part "envelope and provide" as an object to be edited to be stored in the area of Buffer 2 within the buffer 60 (FIG. 12A (B)). The display controller 55 displays the editing frame 44 that describes the selected input content in the frame 41 subjected to range selection (FIG. 12A (C)).

When the user performs correction to delete "and provide" in the editing frame 44, the editing unit 58 stores the corrected object to be edited in the area of Buffer 3 within the buffer 60. The display controller 55 displays the corrected object to be edited stored in Buffer 3 in the editing frame 44 (FIG. 12A (D)).

When the user performs correction to delete "envelope" in the editing frame 44, the editing unit 58 deletes "envelope" from Buffer 3 within the buffer 60. The display controller 55 displays the corrected object to be edited stored in Buffer 3 in the editing frame 44 (FIG. 12B (E)).

When the user performs correction to "develop and provide" in the editing frame 44, the editing unit 58 stores "develop and provide" in Buffer 3 within the buffer 60. The display controller 55 displays the corrected object to be edited stored in Buffer 3 in the editing frame 44 (FIG. 12B (F)).

When the user selects the button of "edit" in the editing frame 44, the content input to the editing frame 44 is stored in Buffer 3 (FIG. 12B (G)). The display controller 55 deletes the editing frame 44 and replaces the part of the object to be edited stored in Buffer 2 in the input content stored in Buffer 1 within the buffer 60 with the content stored in Buffer 3 and displays the replaced content in frame 41 (FIG. 12B (H)). With this operation, the input information support apparatus 11 enables each user to edit the input content displayed in the frame 41 after input and during input.

In FIG. 12B (H), the display controller 55 displays the input content after editing in the frame 41, in which the edited content may be displayed in an identifiable manner.

Figure 13:
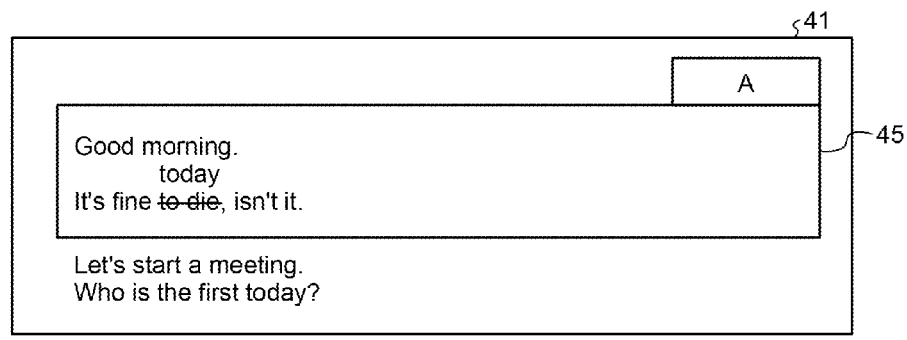
FIG. 13 is a diagram illustrating an example displaying edited content in an identifiable manner.

FIG. 13 is a diagram illustrating an example displaying edited content in an identifiable manner. The display controller 55 may enclose the edited object to be edited in the input content displayed in the frame 41 with a frame 45, display the edited part with the content before editing assumed to be deleted, and display the content after editing at the corresponding part, for example. In the example in FIG. 13, "to die" before editing is attached with a delete line, and "today" after editing is displayed thereabove. The display controller 55 may display the user who has performed editing in an identifiable manner. In the example in FIG. 13, the upper right tab "A" indicates that the user A has performed editing.

Figure 14:
FIG. 14 is a diagram illustrating another example displaying edited content in an identifiable manner.

FIG. 14 is a diagram illustrating another example displaying edited content in an identifiable manner. The display controller 55 may display input content before editing and input content after editing in the frame 41, for example. In the example in FIG. 14, the input content before editing and the input content after editing are displayed with tabs attached in the frame 41. The upper right tab "original data" displays the input content before editing. The upper right tab "1" displays the input content after editing edited first. The upper right tab "2" displays the input content after editing edited second.

Procedure of Processing of Editing

Figure 15:
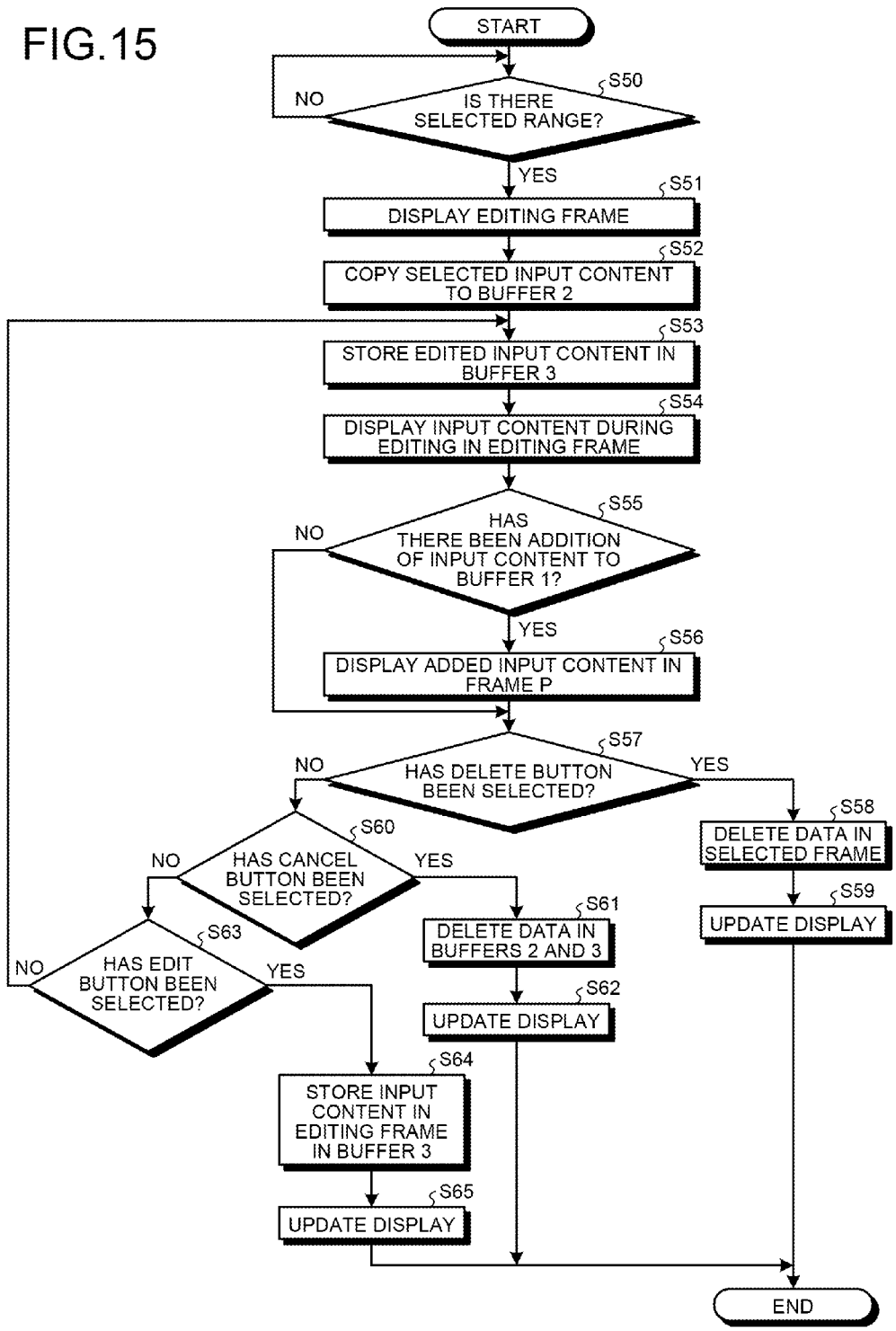
FIG. 15 is a flowchart illustrating an example of a procedure of editing processing.

A procedure of editing processing by which the input information support apparatus 11 according to the present embodiment receives the editing of input content will be explained. FIG. 15 is a flowchart illustrating an example of the procedure of the editing processing. The editing processing is executed at certain timing such as at timing when any frame 41 is selected.

The display controller 55 determines whether range selection has been performed on the selected frame 41 (S50). If range selection has not been performed (No at S50), the processing shifts to S50 again to wait for range selection.

In contrast, if range selection has been performed (Yes at S50), the display controller 55 displays the editing frame 44 for editing the selected range in the frame 41 subjected to range selection (S51). The editing unit 58 copies the input content of the selected range to Buffer 2, which is another storage area within the buffer 60 (S52).

The editing unit 58 stores the edited input content of the editing frame 44 in Buffer 3, which is another storage area within the buffer 60, in accordance with operation on the editing frame 44 (S53). When Buffer 3 is added, the display controller 55 displays the input content stored in Buffer 3 in the editing frame 44 (S54).

The display controller 55 determines whether there has been addition to Buffer 1 that stores therein the input content before editing (S55). If there has been no addition (No at S55), the processing shifts to S57 explained below.

In contrast, if there has been addition (Yes at S55), the display controller 55 displays the frame P and displays the added input content (S56).

The editing unit 58 determines whether the button of delete has been selected (S57). If the button of delete has been selected (Yes at S57), the editing unit 58 deletes the input content of the selected frame 41 from the buffer 60 (S58). The display controller 55 updates the display of the frame 41 of the conversation screen 40 in accordance with the data of the buffer 60 after deletion (S59) and ends the processing.

In contrast, if the button of deletion has not been selected (No at S57), the editing unit 58 determines whether the button of cancel has been selected (S60). If the button of cancel has been selected (Yes at S60), the editing unit 58 deletes the data of Buffers 2 and 3 corresponding to the selected frame 41 (S61). The display controller 55 deletes the editing frame 44 and updates the display of the frame 41 of the conversation screen 40 in accordance with the data of the buffer 60 (S62) and ends the processing.

In contrast, if the button of cancel has not been selected (No at S60), the editing unit 58 determines whether the button of edit has been selected (S63). If the button of edit has been selected (Yes at S63), the editing unit 58 stores the input content displayed in the editing frame 44 in Buffer 3 (S64). The display controller 55 deletes the editing frame 44 and displays the input content with the correction reflected in the frame 41 subjected to range selection (S65) and ends the processing.

In contrast, the button of edit has not been selected (No at S63), the processing shifts to S53, and the editing processing continues.

Effects

As explained above, the input information support apparatus 11 according to the present embodiment receives input from a plurality of users. The input information support apparatus 11 performs control to cause a display unit to display pieces of input content of the users in divided frames in time-series order of reception and display received input content additionally in a frame that displays past input content when a specific condition is satisfied. With this operation, the input information support apparatus 11 displays the pieces of input content that satisfy the specific condition in the same frame, thereby enabling the users to easily understand the input content and improving usability.

In the input information support apparatus 11 according to the present embodiment, the specific condition is that, after the immediately preceding input content is received, the next input content of the same user is received before a predetermined first period of time. The input information support apparatus 11, when the specific condition is satisfied, performs control to display the received input content additionally in a frame that displays the immediately preceding input content of the same user that satisfies the specific condition. With this operation, even when another user performs input midway during the input of the user, the input information support apparatus 11 can display the pieces of input content in the same frame when receiving the next input content before the first period of time after receiving the immediately preceding input content of the user, and the pieces of input content can be made easy to understand.

When receiving the next input content before a second period of time after receiving the immediately preceding input content of the same user, the input information support apparatus 11 according to the present embodiment displays the received input content in the frame that displays the past input content following the past input content. With this operation, the input information support apparatus 11 displays the immediately preceding input content and the next input content of the user in succession, and the pieces of input content can be made easy to understand. When receiving the next input content in a time range between the first period of time and the second period of time after receiving the immediately preceding input content of the same user, the input information support apparatus 11 performs control to display the received input content in the frame that displays the past input content with a line feed after the Past input content. With this operation, the input information support apparatus 11 can visually represent the presence of an interval between the immediately preceding input content and the next input content of the user. A hearing-impaired user in particular is unable to understand with what interval the input content of another user has been input through sounds. Given this situation, the received input content is displayed with a line feed after the past input content, thereby enabling the presence of an interval between the pieces of input content to be visually represented. In addition, the received input content is displayed with a line feed after the past input content, thereby separating the pieces of input content into lines, and the pieces of input content can be made easy to read.

The input information support apparatus 11 according to the present embodiment changes the first period of time to be longer when a method for inputting input content has been changed from the immediately preceding input of the same user. When receiving the next input content before the changed first period of time after receiving the immediately preceding input content of the same user, the input information support apparatus 11 performs control to display the received input content additionally in the frame that displays the immediately preceding input content of the same user. Changing the method of input loses time. Given this situation, the input information support apparatus 11 can display the pieces of input content in the same frame by changing the first period of time to be longer even when the user changes the method of input.

[b] Second Embodiment

The embodiment related to the disclosed apparatus has been explained, and the disclosed technology may be performed with various kinds of different forms apart from the embodiment. Another embodiment included in the present embodiment will be explained below.

Although the embodiment explains a case in which the specific condition is determined based on the time elapsed after the reception of the immediately preceding input content to the reception of the next input content of the same user, the disclosed apparatus is not limited thereto. The specific condition, may be that the immediately preceding input content and the received input content of the same object are a series of pieces of input, for example. The display controller 55 performs analysis of various kinds of natural language processing depending on the language used for the input content on the immediately preceding input content and the received input content of the same object, for example. Although examples of the natural language processing include morphological analysis, syntactic analysis, and contextual analysis, they are not limiting. Any method of analysis may be used so long as it can determine that the pieces of input content are a series of pieces of input. When it is determined by the analysis that the immediately preceding input content and the received input content are highly related to each other and are a series of pieces of input, the display controller 55 may perform control to display the received input content additionally in the frame that displays the immediately preceding input content. The display controller 55 analyzes a document structure such as dependency and a part of speech for only the immediately preceding input content or for the immediately preceding input content and the received input content separately, for example. The display controller 55 analyzes the document structure with the immediately preceding input content and the received input content connected to each other. The display controller 55 may determine to be a series of pieces of input when, by the analysis, the document structure is clearer and the analysis result is better when the immediately preceding input content and the received input content are connected to each other than when only the immediately preceding input content is analyzed or the immediately preceding input content and the received input content are separately analyzed. The display controller 55 analyzes the meaning of only the immediately preceding input content or the immediately preceding input content and the received input content separately by the natural language processing, for example. The display controller 55 analyzes the meaning with the immediately preceding input content and the received input content connected to each other by the natural language processing. The display controller 55 may determine to be a series of pieces of input when, by the analysis, there are less number of unclear points, and the analysis result is better when the immediately preceding input content and the received input content are connected to each other than when only the immediately preceding input content is analyzed or the immediately preceding input content and the received input content are separately analyzed. The elapsed time and the analysis may be combined with each other. The display controller 55 performs various kinds of analysis of the natural language processing on the immediately preceding input content and the received input content, in which the time elapsed after the reception of the immediately preceding input content to the reception of next input content of the same user is less than the first period of time, for example. When it is determined by the analysis that the immediately preceding input content and the received input content are highly related to each other and are a series of pieces of input, the display controller 55 may perform control to display the received input content additionally in the frame that displays the immediately preceding input content.

Although the embodiment explains a case in which each input information support apparatus 11 transmits input content input to the other input information support apparatus 11, and each input information support apparatus 11 displays the input content of the other input information support apparatus 11, the disclosed apparatus is not limited thereto. For example, with a server apparatus provided, each input information support apparatus 11 may transmit the input content input to the server apparatus, and the server apparatus may generate the conversation screen 40 from the input content received from each input information support apparatus 11 and distribute the conversation screen 40 to each input information support apparatus 11. In contrast, as in the present embodiment, each input information support apparatus 11 transmits the input content input to the other input information support apparatus 11, and each input information support apparatus 11 displays the input content of the other input information support apparatus 11, thereby enabling the meeting support system 10 to be constituted without providing any server apparatus.

The components of each illustrated apparatus are functionally conceptual and are not necessarily needed to be physically constituted as illustrated. In other words, the specific states of distribution and integration of each apparatus are not limited to the illustrated ones, and the whole or part thereof can be constituted with functional or physical distribution and integration based on any unit in accordance with various kinds of loads and use conditions. For example, the processing units including the device processing unit 51, the buffer change sensing unit 52, the transmitting unit 53, the receiving unit 54, the display controller 55, the changing unit 56, the selection determining unit 57, and the editing unit 58 may appropriately be integrated. The pieces of processing of the respective processing units may appropriately be divided into pieces of processing of a plurality of processing units. The whole or part of processing functions performed by the respective processing units can be implemented by a CPU or a program analysis executed by the CPU or implemented as hardware by wired logic.

Computer Program

The various kinds of processing explained in the embodiments can be implemented by executing a computer program prepared in advance by a computer having a configuration similar to that of FIG. 2 such as a personal computer and a workstation. An example of the computer that executes a computer program having functions similar to those of the embodiments will be explained below.

The HDD 23 illustrated in FIG. 2 stores therein in advance a computer program that exhibits functions similar to those of the buffer change sensing unit 52, the transmitting unit 53, the receiving unit 54, the display controller 55, the changing unit 56, the selection determining unit 57, and the editing unit 58. The computer program may appropriately be separated.

The HDD 23 stores therein various kinds of information. The HDD 23 stores therein an OS and various kinds of data for use in various kinds of processing, for example.

The CPU 20 reads and executes the computer program stored in the HDD 23, thereby executing operations similar to those of the respective processing units of the embodiments. In other words, the computer program executes operations similar to those of the buffer change sensing unit 52, the transmitting unit 53, the receiving unit 54, the display controller 55, the changing unit 56, the selection determining unit 57, and the editing unit 58.

Such a computer program is not necessarily needed to be stored in the HDD 23 in advance.

The computer program is stored in a "portable physical medium" such as a flexible disk (FD), a CD-ROM, a DVD disc, a magneto-optical disc, and an IC card to be inserted into a computer, for example. The computer may read the computer program from these and execute the computer program.

Furthermore, the computer program is stored in "another computer (or a server)" or the like connected to the computer via a public line, the Internet, a LAN, a WAN, or the like. The computer may read the computer program from these and execute the computer program.

In one aspect of the present invention, usability can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An input information support apparatus comprising a memory and a processor coupled to the memory, the processor being configured to execute a process including:
receiving input content from a plurality of objects, wherein the input content can be displayed on a display unit and is converted from information input via an input device associated with each of the plurality of objects, and storing in the memory the received input content, identification information for each of the objects and time information as to when the input content is received, the identification information and the time information being associated with the input content; and
performing control, based on the stored input content, identification information and time information, to cause the display unit to:
display a plurality of frames in a non-overlapping arrangement in time-series order, the frames including a first frame and a second frame, the first frame containing a piece of the received input content having the identification information identifying a first of the objects and the time information as being at a first time, the second frame containing a piece of the received input content having the identification information identifying a second of the objects and the time information as being at a second time after the first time; and
modify the first frame by adding, after the piece of the received input content, another piece of the received input content having the identification information identifying the first of the objects when the another piece of the received input content has the time information being at a third time after the second time and within a first period of time after the first time.

2. The input information support apparatus according to claim 1, wherein the processor further performs the control to cause the display unit to further modify the first frame by adding a line feed before the another piece of the received input content having the identification information identifying the first of the objects when the another piece of the received input content has the time information being at the third time that is greater than a second period of time after the first time and less than the first period of time.

3. The input information support apparatus according to claim 1, wherein the processor is configured to execute the process further including when changing an input method for inputting the input content to another one after receiving the piece of the input content having the identification information identifying the first of the objects, increasing the first period of time.

4. The input information support apparatus according to claim 1, wherein the processor performs the control to cause the display unit to modify the first frame by adding, after the piece of the received input content, the another piece of the received input content, when the piece of the received input content and the another piece of the received input content are analyzed to be a series of pieces of the received input content.

5. A method for supporting input information that causes a computer to execute a process comprising:
receiving input content from a plurality of objects, wherein the input content can be displayed on a display unit and is converted from information input via an input device associated with each of the plurality of objects, and storing in a memory the received input content, identification information for each of the objects and time information as to when the input content is received, the identification information and the time information being associated with the input content; and
performing control, based on the stored input content, identification information and time information, to cause the display unit to:
display a plurality of frames in a non-overlapping arrangement in time-series order, the frames including a first frame and a second frame, the first frame containing a piece of the received input content having the identification information identifying a first of the objects and the time information as being at a first time, the second frame containing a piece of the received input content having the identification information identifying a second of the objects and the time information as being at a second time after the first time; and modify the first frame by adding, after the piece of the received input content, another piece of the received input content having the identification information identifying the first of the objects when the another piece of the received input content has the time information being at a third time after the second time and within a first period of time after the first time.

6. A non-transitory computer-readable recording medium having stored therein a program that causes a computer to execute a process comprising:

receiving input content from a plurality of objects, wherein the input content can be displayed on a display unit and is converted from information input via an input device associated with each of the plurality of objects, and storing in a memory the received input content, identification information for each of the objects and time information as to when the input content is received, the identification information and the time information being associated with the input content; and performing control, based on the stored input content, identification information and time information, to cause the display unit to:

display a plurality of frames in a non-overlapping arrangement in time-series order, the frames including a first frame and a second frame, the first frame containing a piece of the received input content having the identification information identifying a first of the objects and the time information as being at a first time, the second frame containing a piece of the received input content having the identification information identifying a second of the objects and the time information as being at a second time after the first time; and modify the first frame by adding, after the piece of the received input content, another piece of the received input content having the identification information identifying the first of the objects when the another piece of the received input content has the time information being at a third time after the second time and within a first period of time after the first time.

* * * * *